UNITED STATES PATENT OFFICE.

FELIX RICHTER, OF FRANKFORT-ON-THE-MAIN, AND LUDWIG von ORTH, OF BERLIN, GERMANY.

PROCESS FOR BLEACHING SOLID AND SEMISOLID FATS OF ALL KINDS.

1,072,034. Specification of Letters Patent. Patented Sept. 2, 1913.

No Drawing. Application filed September 28, 1910. Serial No. 584,281.

*To all whom it may concern:*

Be it known that we, FELIX RICHTER and LUDWIG VON ORTH, citizens of the German Empire, and residents of Frankfort-on-the-Main and Berlin, Germany, respectively, have invented certain new and useful Improvements in and Relating to Processes for Bleaching Solid and Semisolid Fats of all Kinds, of which the following is a specification.

Our invention relates to bleaching solid and semi-solid fats of all kinds, and consists in treating the fats with an aluminium oxid of a special origin, namely that aluminium oxid which is obtained from aluminium amalgam, preferably by calcining the same with admission of oxygen-containing gases, such as atmospheric air. This particular aluminium oxid has much higher absorptive power than those produced by other processes, for instance by heating trihydrate of aluminium. It has also a different physical structure, as appears from its low specific gravity, 0.25, the aluminium oxid produced by heating trihydrate of aluminium having a specific gravity of about 0.75 and other sorts have still higher specific gravities up to say 1.5. A suitable method of producing the oxid is as follows: Aluminium amalgam in the form of small grains is exposed to atmospheric air or other oxygen-containing gases. Fiber-like extensions then form on the grains, substantially consisting of aluminium oxid. These extensions are separated from the residues not transformed to fibers, by sifting, and the fiber-material sifted off forms a very bulky substance of very small specific gravity. If these aluminium oxid fibers are then calcined, to drive off any mercury adhering thereto and to complete the transformation of the material to aluminium oxid, the resulting product has the specified low specific gravity of about 0.25. When fats in a molten or dissolved state are filtered through a layer of the said aluminium oxid, the dying stuffs and the impurities contained in the fats, are absorbed by the filter to such an extent that a perfectly white and almost odorless product is obtained, which has a very pure taste.

When filtering the fats in a molten state, it is advisable to heat the aluminium oxid, if possible, before the beginning of, and during, the process, to a temperature beyond the melting point of the fat, whereby the filtering process will be greatly facilitated. In order to cause the mass of fat to pass in a uniform manner through the layer of aluminium oxid, and in order to prevent the material from passing along the walls of the filtering vessel, without having been sufficiently acted upon by the aluminium oxid, it is advisable to provide a layer of ground glass or quartz on the aluminium oxid layer, and in some cases also below it. The filtering of the molten fat is preferably effected at as low temperature as possible, exceeding the melting point of the fat only by 10 to 15° C.

Instead of effecting the bleaching of the fats by filtration, the process could be carried out, more particularly if the requirements as to the colorlessness of the product to be obtained are less stringent, by thoroughly mixing the fat to be treated, also in a molten or dissolved state, with the aluminium oxid for a long time, for instance an hour, and then separating the purified product from the aluminium oxid, by allowing it to settle or by some filtration process of any known kind.

The dirty aluminium oxid can be regenerated again by calcining, because it is not decomposed, as oxid, by the calcining process. The fat remaining in the aluminium oxid, can be recovered again by extraction.

What we claim is:

1. A process for bleaching solid and semi-solid fats of all kinds, consisting in treating it in divided condition with aluminium oxid obtained from aluminium amalgam.

2. A process for bleaching solid and semisolid fats of all kinds, consisting in filtering the fat in divided condition through a layer of aluminium oxid obtained from aluminium amalgam.

3. A process for bleaching solid and semi-solid fats of all kinds, consisting in filtering the fat in divided condition through a heated layer of aluminium oxid obtained from aluminium amalgam.

4. A process for bleaching solid and semi-solid fats of all kinds, consisting in filtering molten fat through a layer of aluminium oxid obtained from aluminium amalgam.

In testimony whereof I have signed this specification in the presence of two subscribing witnesses.

FELIX RICHTER.

Witnesses:
JEAN GRUND,
CARL GRUND.

In testimony whereof I have signed this specification in the presence of two subscribing witnesses.

LUDWIG von ORTH.

Witnesses:
HENRY HASPER,
WOLDEMAR HAUPT.